United States Patent [19]

Haas

[11] Patent Number: 4,900,130

[45] Date of Patent: Feb. 13, 1990

[54] METHOD OF SCANNING

[75] Inventor: Daniel D. Haas, Rochester, N.Y.

[73] Assignee: Eastman Kodak Company, Rochester, N.Y.

[21] Appl. No.: 254,745

[22] Filed: Oct. 7, 1988

[51] Int. Cl.[4] .................. G02B 27/00; G01D 9/42
[52] U.S. Cl. ..................... 350/321; 350/320; 346/107 R; 358/302; 382/47; 355/1
[58] Field of Search ............. 350/321, 320, 96.20, 350/96.25; 346/107 R; 358/302; 355/1, 234, 54, 235; 382/47

[56] References Cited

U.S. PATENT DOCUMENTS

| | | | |
|---|---|---|---|
| 4,093,964 | 6/1978 | Aughton | 358/302 |
| 4,097,846 | 6/1978 | Lewis | 382/47 |
| 4,198,158 | 4/1980 | Knowlton | 355/54 |
| 4,389,655 | 6/1983 | Baues | 346/107 R |
| 4,435,064 | 3/1984 | Tsukada et al. | 355/1 |
| 4,566,015 | 6/1986 | MacKenzie | 346/107 R |
| 4,723,830 | 2/1988 | Messbauer | 350/96.20 |

Primary Examiner—Bruce Y. Arnold
Assistant Examiner—Loha Ben
Attorney, Agent, or Firm—Donald D. Schaper

[57] ABSTRACT

A method of scanning is disclosed in which an array of light sources is used to record an image on a light-sensitive recording medium. Each of the light sources is modulated in accordance with an information signal. Multiple passes of the array are made relative to the recording medium, and a set of raster lines is recorded in each pass. The raster lines of successive sets are interleaved to space the raster lines closer together than the spacing of the light sources in the array. In order to provide precise spacing of the raster lines, the array of light sources is advanced a constant distance between successive sets of raster lines.

11 Claims, 5 Drawing Sheets

| | NUMBER OF ARRAY PASSES p | 1 | 2 | 3 | 4 | 5 | 6 |
|---|---|---|---|---|---|---|---|
| INDEX OF FILLED-IN RASTER LINE r | | | | | | | |
| ELEMENT 1 INACTIVATED | | ELEMENT1 | | | | | |
| ELEMENT 2 INACTIVATED | | ELEMENT2 | | | | | |
| ELEMENT 1 INACTIVATED | | | ELEMENT1 | | | | |
| ELEMENT 3 INACTIVATED | | ELEMENT3 | | | | | |
| r = 1 | | | ELEMENT2 | | | | |
| 2 | | ELEMENT4 | | | | | |
| 3 | | | | ELEMENT1 | | | |
| 4 | | | ELEMENT3 | | | | |
| 5 | | ELEMENT5 | | | | | |
| 6 | | | | ELEMENT2 | | | |
| 7 | | | ELEMENT4 | | | | |
| 8 | | | | | ELEMENT1 | | |
| 9 | | | | ELEMENT3 | | | |
| 10 | | | ELEMENT5 | | | | |
| 11 | | | | | ELEMENT2 | | |
| 12 | | | | ELEMENT4 | | | |
| 14 | | | | | ELEMENT3 | | |
| 15 | | | | ELEMENT5 | | | |
| 17 | | | | | ELEMENT4 | | |
| 20 | | | | | ELEMENT5 | | |

| | | | | | | | | | | | |
|---|---|---|---|---|---|---|---|---|---|---|---|
| 1 | 1 | 7 | 1 | 7 | 13 | 1 | 7 | 13 | 7 | 13 | 13 |
| 1 | 1 | 7 | 1 | 7 | 13 | 1 | 7 | 13 | 7 | 13 | 13 |
| 2 | 2 | 8 | 2 | 8 | 14 | 2 | 8 | 14 | 8 | 14 | 14 |
| 1 | 1 | 7 | 1 | 7 | 13 | 1 | 7 | 13 | 7 | 13 | 13 |
| 2 | 2 | 8 | 2 | 8 | 14 | 2 | 8 | 14 | 8 | 14 | 14 |
| 1 | 1 | 7 | 1 | 7 | 13 | 1 | 7 | 13 | 7 | 13 | 13 |
| 3 | 3 | 9 | 3 | 9 | 15 | 3 | 9 | 15 | 9 | 15 | 15 |
| 2 | 2 | 8 | 2 | 8 | 14 | 2 | 8 | 14 | 8 | 14 | 14 |
| 1 | 1 | 7 | 1 | 7 | 13 | 1 | 7 | 13 | 7 | 13 | 13 |
| 3 | 3 | 9 | 3 | 9 | 15 | 3 | 9 | 15 | 9 | 15 | 15 |
| 2 | 2 | 8 | 2 | 8 | 14 | 2 | 8 | 14 | 8 | 14 | 14 |
| 4 | 4 | 10 | 4 | 10 | 16 | 4 | 10 | 16 | 10 | 16 | 16 |
| 3 | 3 | 9 | 3 | 9 | 15 | 3 | 9 | 15 | 9 | 15 | 15 |
| 2 | 2 | 8 | 2 | 8 | 14 | 2 | 8 | 14 | 8 | 14 | 14 |
| 4 | 4 | 10 | 4 | 10 | 16 | 4 | 10 | 16 | 10 | 16 | 16 |
| 3 | 3 | 9 | 3 | 9 | 15 | 3 | 9 | 15 | 9 | 15 | 15 |
| 5 | 5 | 11 | 5 | 11 | 17 | 5 | 11 | 17 | 11 | 17 | 17 |
| 4 | 4 | 10 | 4 | 10 | 16 | 4 | 10 | 16 | 10 | 16 | 16 |
| 3 | 3 | 9 | 3 | 9 | 15 | 3 | 9 | 15 | 9 | 15 | 15 |
| 5 | 5 | 11 | 5 | 11 | 17 | 5 | 11 | 17 | 11 | 17 | 17 |
| 4 | 4 | 10 | 4 | 10 | 16 | 4 | 10 | 16 | 10 | 16 | 16 |
| 6 | 6 | 12 | 6 | 12 | 18 | 6 | 12 | 18 | 12 | 18 | 18 |
| 5 | 5 | 11 | 5 | 11 | 17 | 5 | 11 | 17 | 11 | 17 | 17 |
| 4 | 4 | 10 | 4 | 10 | 16 | 4 | 10 | 16 | 10 | 16 | 16 |
| 6 | 6 | 12 | 6 | 12 | 18 | 6 | 12 | 18 | 12 | 18 | 18 |
| 5 | 5 | 11 | 5 | 11 | 17 | 5 | 11 | 17 | 11 | 17 | 17 |
| 6 | 6 | 12 | 6 | 12 | 18 | 6 | 12 | 18 | 12 | 18 | 18 |
| 5 | 5 | 11 | 5 | 11 | 17 | 5 | 11 | 17 | 11 | 17 | 17 |
| 6 | 6 | 12 | 6 | 12 | 18 | 6 | 12 | 18 | 12 | 18 | 18 |
| 6 | 6 | 12 | 6 | 12 | 18 | 6 | 12 | 18 | 12 | 18 | 18 |

Fig. 6

METHOD OF SCANNING

BACKGROUND OF THE INVENTION

1. Field of the Invention

The present invention relates to a method of scanning in an optical device, and more particularly to such a method which is adapted to produce a high resolution image.

2. State of the Prior Art

Exposure systems for recording information on a light-sensitive recording medium often employ multiple radiation sources operating in parallel to decrease the aggregate amount of time required to complete the exposure. In U. S. Pat. No. 4,389,655, there is shown an optical device for non-impact recording in which a recording head includes a linear array of optical fibers. A recording medium is moved relative to the recording head, and the fibers of the head are arranged with their output ends extending in a direction transverse to the direction of movement of the recording medium. A light source is connected to each of the fibers at an input end, and each of the light sources is modulated in accordance with an information signal to produce a desired image. A problem with devices of the type shown in this patent is that it is often desirable to expose a line pattern having a spacing between lines (called the raster spacing) which is smaller than the closest possible spacing of the sources, the closest spacing being determined by the physical size of the sources.

Various methods have been used to decrease the raster spacing. One method has been to tilt the array of sources at an angle other than perpendicular to the direction of the lines, as shown, for example, in U. S. Pat. No. 4,435,064. Tilting of the array, however, requires the data in various lines to be delayed by differing amounts, and elongates the pattern of sources in the direction of the lines. Tilting of the array also causes any deviation of the sources from a straight line to be converted into unequal spacing of the exposed lines. Thus, other methods of decreasing the spacing have been tried including the interleaving of images, as shown, for example, in U. S. Pat. No. 4,198,158.

U. S. Pat. No. 4,198,158, discloses a method for superposing a plurality of matrix display images on a record medium. Successive images presented on a plasma panel are caused to be offset from one another on the record medium by interposing a tilted plate of glass between the plama panel and the record medium. One of the problems with this system is that matrix displays are not suitable for use in many types of recording apparatus, such as, for example, drum recorders. A further problem is that the size of the image which can be exposed is limited by the size of the display.

SUMMARY OF THE INVENTION

It is an object of the present invention to overcome the problems in the prior art noted above and to provide an improved method of scanning in an optical device.

In accordance with one aspect of the invention, there is provided a method of scanning for use in a device having an array of operative elements which interact with an image storage medium, the method comprising the steps of: moving the medium and the array relative to each other to produce successive sets of raster lines, at least some of the raster lines in one set being interleaved with raster lines in another set; and producing relative movement between the array and the medium for a constant predetermined distance in a direction transverse to the raster lines after each set of lines is produced.

In one embodiment of the present invention, an array of optical fibers is used to produce a set of raster lines on a recording medium which is supported on a rotatable drum. The array is advanced a constant distance after each set of raster lines, and the light sources for the optical fibers are controlled during the production of each set of raster lines to ensure that each source produces image points at appropriate locations.

A principal advantage of the method of the present invention is that a scanning head having multiple elements can be advanced a constant distance after each set of raster lines is produced. As a result of this feature, a very precise spacing of the raster lines can be accomplished, and the timing of the various components in the recording device is greatly simplified. A further advantage of the present invention is that the scanning head can be driven at a constant velocity in certain embodiments of the invention.

Other features and advantages will become apparent with reference to the following Description of the Preferred Embodiments when read in light of the attached drawings.

BRIEF DESCRIPTION OF THE DRAWINGS

FIG. 4 is a combined timing-location diagram showing interleaved raster lines produced by an array of five elements; and FIGS. 5 and 6 are diagrams which illustrate the method of the present invention when used to perform two-dimensional interleaving.

DESCRIPTION OF THE PREFERRED EMBODIMENT

The present invention is described herein with reference to a printer. However, the invention is also applicable to an input scanner which is used to convert an image into an electrical signal. The term "image storage medium", as used herein, is intended to include any medium on which an image can be formed as well as any medium which has an image formed thereon such as, for example, a photographic film, a photoconductor, or a document. A "set of raster lines" are traced on the image storage medium by one pass of a scanning head having multiple elements. "Interleaving" refers to the tracing of additional raster lines between raster lines traced in a previous pass, or passes, of the scanning head. The term "raster" refers to a completed pattern of raster lines, i. e., all of the raster lines are filled in, which provides substantially uniform coverage of an area of an image storage medium.

Figure 1:
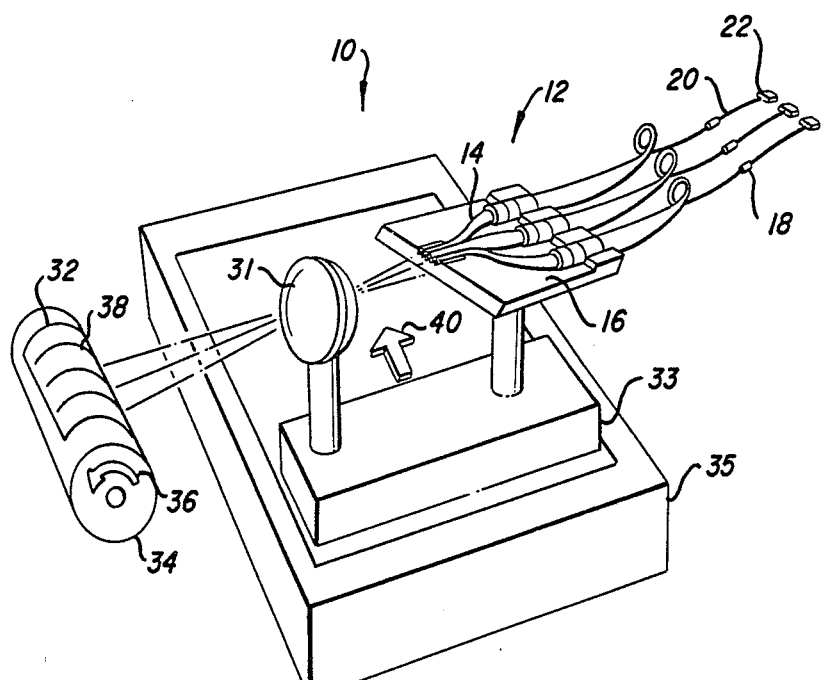
FIG. 1 is a perspective view of apparatus which is suitable for use in performing the method of the present invention.
Figure 2:
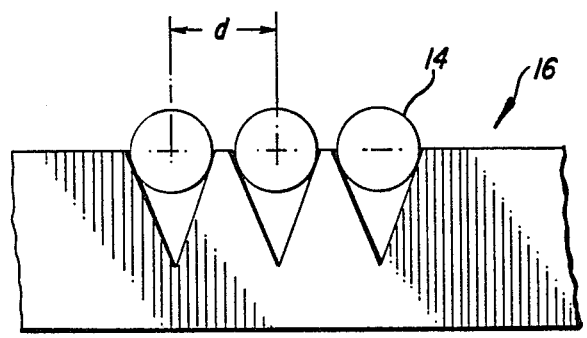
FIG. 2 is a partial elevational end view of the array of optical fibers.

With reference to FIG. 1, there is shown a printer 10 which can be used to practice the method of the present invention. Printer 10 includes a scanning head in the form of a fiber optic array 12. Fiber optic array 12 is made up of three operative elements, each of which includes an optical fiber 14 supported on a substrate 16. Each optical fiber 14 is connected by means of an optical fiber connector 18 to another optical fiber 20. Optical fiber connector 18 can be of the type shown in commonly-assigned U.S. Pat. No. 4,723,830, entitled Optical Fiber Connectors, issued Feb. 9, 1988. Each of the optical fibers 20 is connected to a light source 22, such as a diode laser or a light-emitting diode. Each light source 22 in array 12 can be modulated according to an information signal in a well-known manner. Light from optical fibers 14 is focussed on a recording medium 32 by means of a lens 31. Both lens 31 and fiber optic array 12 are mounted on a carriage 33 which is supported for linear movement on a base 35. The number of operative elements in array 12 is shown as three in FIG. 1. It will be apparent, however, that the number of elements could be more or less than three.

Recording medium 32 is supported on a drum 34 which is driven in the direction of arrow 36. The recording medium 32 can be, for example, photographic film. As drum 34 is rotated, a set of raster lines 38 are formed on recording medium 32, and at the completion of each set of raster lines 38, carriage 33 is advanced a constant distance in the direction of arrow 40. Successive sets of raster lines 38 are traced on recording medium 32 until a desired image has been completed.

In the discussion herein of the present invention, certain elements of the invention are referred to by letters. The letters and the elements they refer to are, as follows:

d—center-to-center spacing of the array elements or of their images on the recording medium
N—number of array elements
n—index number of an element in the array
p—number of a pass of the array
S—step size of the array
r—index number of a raster line
Y—spacing between raster lines in a raster
k—an integer which is the interleaving factor, that is, the number which determines the number of raster lines interleaved into a set of raster lines
D—delay for an element n expressed in number of passes In a known method of scanning with an array, for example, of N elements separated by equal center-to-center spacings "d," a raster of spacing Y can be written where:

$$Y = d \qquad (1)$$

by rotating the drum once to move the recording medium past the array. In a first pass, N raster lines are exposed simultaneously. The array is then translated a distance Nd in a direction transverse to the raster lines; and in a second pass, the next set of raster lines is written. It is also known to write rasters with spacings Y which are submultiples of d, i.e., $$Y = d/k \qquad (2)$$

where k is any integer, by the steps of: writing a set of N raster lines with one rotation of the drum, translating the array a distance d/k across the recording medium, writing another set of N raster lines during a subsequent rotation of the drum, and repeating this process a total of (k−1) times to fill in the raster. At the end of this process, the array must be translated across the recording medium a distance $[N-1+(1/k)]d$ with respect to the recording medium to avoid exposing previously written raster lines a second time. The motion of an array in this process is an undesirable combination of several small steps alternating with a large step. The accuracy of the large steps must be the same as the accuracy of the small steps and the same as the accuracy of the spacing d of the elements in the array in order to maintain a requisite constancy of spacing of raster lines in the exposed raster pattern.

In the method of the present invention, an array of N elements can expose a raster of spacing Y which is a submultiple of the spacing d of the array elements, by translating the array a constant step size between the writing of successive sets of raster lines. An array step size S where $$S = Nd/k \qquad (3)$$

can be produced by this method as long as N and k do not have any common factors other than one; in other words, this relationship holds as long as the least common multiple of N and k is Nk. This means that N, the number of elements in the array, should preferably be prime in order to produce the greatest variety of raster spacings, although primality of N is not a necessary condition for successful implementation of the present invention. If N and k have a common factor, interleaving of lines will produce multiple-exposure of some raster lines or skipping of other raster lines.

Figure 3:
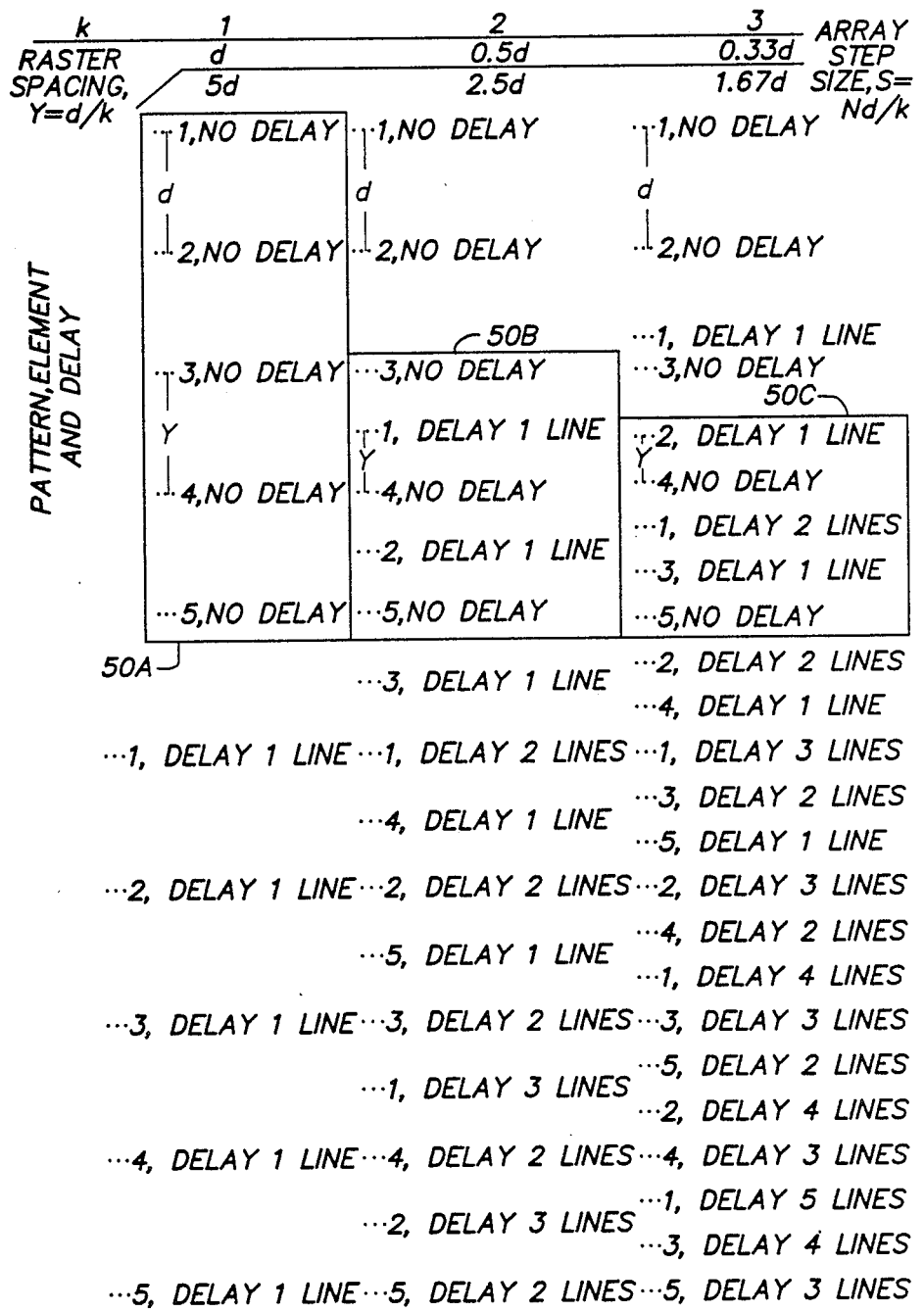
FIG. 3 is diagram illustrating interleaved raster lines produced by an array of equally spaced elements.

In FIG. 3, there is shown an implementation of a method of interleaving of raster lines using an array of equally spaced elements in which N, the number of elements, is equal to five and d is the spacing between elements. As indicated in FIG. 3, the raster spacing Y is equal to d/k where k is an integer. The light sources in the array have been designated $n = 1-5$. In the column designated A, a known implementation of multiple sources is shown when $k = 1$, that is the raster spacing Y is equal to the spacing d of the elements. In column B, an implementation of the present invention is shown for $k = 2$, and in column C, an implementation of the present invention is shown for $k = 3$. The first line of a raster in the image formed in columns A, B, and C is the first line in boxed areas 50A, 50B, and 50C, respectively.

It will be seen in column B that the first line of the image is formed by element 3 during the first pass ($p = 1$) of the array across the recording medium which produces the first set of raster lines and that elements 1 and 2 are not actuated during this first pass. In the second pass, which produces the second set of raster lines, and in subsequent passes, all of the elements are actuated. In forming the last lines of the image, certain of the elements will not be actuated, and the elements not actuated will be in reverse order to the nonactuated elements at the start of the image. Thus, for example, in column B, elements 1 and 2 are not actuated in forming the first raster lines of the image and elements 4 and 5 would not be actuated in forming the last raster lines of the image.

The boxed areas 50A, 50B, and 50C represent the repetitive order of elements for adjacent raster lines and the relative delays required. Raster line r spaced $Y = d/k$ from an adjacent line is written by element n in an N element array on pass p according to $$r = Np - k(N - n) \qquad (4)$$

The identity of element n writing raster line r, and the pass p when this line is written, are unique when N and k have no common factors, and can be deduced by trial substitutions of n and p into equation (4). Note that element n=N always writes raster line r=Np on pass p, regardless of the interleaving factor k.

As shown in FIG. 3, the delay D for an element n is the number of inactive passes that the element must make across the document before reaching the first line r in the raster to be exposed or read by that element, and is the largest integer satisfying the relation:

$$D \leq k(1-n/N) \quad (6)$$

With reference to column C of FIG. 3, an example of the delay D can be shown for an element n=3 in an array of N=5 elements when k=3. During the first pass p=1 of the array across the medium, element n=3 will be inactivated. This implies that data destined to be written by element n=3 should be delayed for the duration of this pass (i.e., delayed for one line). Element n=3 reaches the location of its first line r=4 in the raster on its second pass p=2 across the medium, so the total amount of delay is D=1 line for this element which is in accordance with the algebraic relation in equation (6)

$$D \leq k(1-n/N) = 3(1-3/5) = 1\ 1/5$$

Note that data for element n=N (i.e., the last element in the array) never needs to be delayed, regardless of the values of N and k, because element n=N always writes the last raster line r=N of the first filled-in section of the raster. Each element n of the array is responsible for one, and only one, line of the first filled-in section of the raster (lines r=1 to r=N enclosed in boxes 50A, 50B, and 50C). This sequence of elements responsible for raster lines repeats in the same order for subsequent groups of raster lines r=IN+1 to r=(I+1)N where I is a positive integer. The number of lines of delay D(n) is specific to element n for the combination of operating parameters N and k, and D(n) remains constant for that element n throughout the exposure or reading of the document.

Another illustration of the present invention is shown in FIG. 4. The diagram in FIG. 4 is a combined timing-location diagram of interleaving lines exposed with an array of five elements (N=5) equally spaced by distance d. In the diagram shown, k is equal to 3, and the raster spacing Y is thus equal to d/3. It will be noted that the arrangement shown in FIG. 4 uses the same operating parameters as the arrangement shown in column C of FIG. 3. In FIG. 4, initiation of subsequent sets of raster lines are offset to the right, as viewed in FIG. 4, to facilitate recognition of the number of passes p by the array required for a specific element to arrive at a raster line which is exposed by that element. It will be understood, however, that the raster lines in FIG. 4 are offset to the right for purposes of illustration and that in most applications, all of the rasters would be written with the left side of all of the raster lines occurring at the same distance from the edge of the recording medium. In FIG. 4, the first raster line in the image is indicated as being r=1, and a raster, that is a completed pattern of raster lines, is shown by raster lines r=1-12.

In the examples of the present invention described above, certain of the elements are inactivated during the forming of certain sets of raster lines. The elements which are inactivated and the order in which they are inactivated varies with the number N of elements used and with the interleaving factor k. A general statement of the number of elements inactivated and the order in which they are inactivated can be made for each N and k. An element n is inactivated on pass p of an N element array if $$n \leq N - Np/k \quad (7)$$

In FIGS. 5 and 6, diagrams are shown which illustrate the present invention when used to perform two-dimensional interleaving. In FIG. 5, there is shown, diagrammatically, a pattern formed by individual scan areas which can be produced by an array having a matrix of N×M operative elements (not shown). In FIG. 5, each scan area is indicated by the number 1, and the relative location of the areas is indicated by the number in parentheses. A pattern which can be formed by successive passes of an array is shown in FIG. 6, with the array pass being indicated by the number shown; that is, in a first pass (p=1), a pattern is formed by scan areas indicated by 1's, and a second pass (p=2), a pattern is formed by scan areas indicated by 2's and etc.

After each pass in a predetermined number of passes, the image storage medium (not shown) and the array are moved relative to each other in a first direction, and after the predetermined number of passes, the array and the storage medium are moved relative to each other in a direction transverse to the first direction. In the example shown in FIG. 6, the predetermined number of passes is six, the first direction is in a vertical direction, and the transverse direction is in a horizontal direction. It will be seen that, before the next pass (p=7), there must also be relative movement between the array and the storage medium in a direction opposite to the first direction. It will be apparent that the scan areas in the pattern can be exposures in a print mode or read areas in a read mode. The boxed-in area in FIG. 6 demarcates a raster in an image.

From the foregoing discussion, it will be seen that interleaving raster lines by the method of the present invention does not require physical intervention with the array of elements, and the method can be accomplished by changes in the order of sending entire lines of data to the array elements and adjustment of the step size for translation of the array with respect to the image.

The method of the present invention can be implemented with known electrical circuits (not shown) which are used to effect the scanning of an image and the interconversion between a visible manifestation of the image and the corresponding electronically stored version. A frame store, for example, can be used. A frame store is an electronic storage device comprising, conceptually, a two-dimensional array of storage locations typically composed of shift registers. The number of storage locations in the frame store is substantially equal to the number of pixels in the visual image. The indices of each storage location in the frame store correspond to the spatial location of a pixel in the visual manifestation of the image. A common method of output scanning with a single element exposes the image in accordance with the sequence of locations in the frame store. This common system might be modified, for example, in either of two ways in order to implement the disclosed method of scanning interleaved raster lines with a multiple-source array. First, the data sequence sent to each element could be lengthened by an additional number of shift registers so that the output of that element would be delayed by the appropriate number of scanning passes of the multiple-source array. Second, the electronic-data values for elements whose exposures must be delayed could be inserted into locations with higher line indices in the frame store to compensate for the requisite delay.

Both the step size S of the array and the spacing d of the array elements should have the same absolute precision as the spacing desired in the final raster Y. Interleaving of lines with a constant step size of the array can be used in place of, or in addition to, tilt of the array (not shown) to generate narrowly spaced lines. The step size S for array translation is always equal to or less than half of the length Nd of the array, that is $S \leq Nd/2$, so that this method of interleaving avoids the large but precise steps required by the known method of filling in the raster with two different step sizes. The fact that the disclosed method of interleaving lines permits use of constant-sized steps of the array with respect to the image between initiation of writing successive sets of raster lines means that the array can equivalently be translated at constant velocity with respect to the length of the image while the writing spots are fast-scanned at the appropriate angle across the document to produce raster lines perpendicular to the length of the image.

Images of the array elements can be substituted for the original elements for exposure of photosensitive material. The disclosed method of interleaving raster lines can also be practiced in other physical systems utilizing multiple elements which do not operate upon the principle of emission of optical radiation, such as impact printing, electron-beam scanning, ion implantation, sputtering, or scratching with a stylus. Further, although the present invention is disclosed as being used with an output device, it will be apparent that the method could be practiced in an input scanner which is used to convert an image into an electrical signal. In such an application, the image storage medium for storing information could be a document or photographic film, and the operative elements of the array could include photodiodes or charge-coupled devices.

The invention has been described in detail with particular reference to a preferred embodiment thereof, but it will be understood that variations and modifications can be effected within the spirit and scope of the invention.

I claim:

1. A method of scanning for use in a device having an array of operative elements which interact with an image storage medium, said method comprising the steps of:
    moving said medium and said array relative to each other to produce successive sets of raster lines, at least some of the raster lines in one set being interleaved with raster lines in another set; and
    producing relative movement between said array and said medium for a constant predetermined distance in a direction transverse to said raster lines after each set of lines is produced.

2. A method, as defined in claim 1, wherein said operative elements include light sources, and some of said sources are inactivated during the formation of some of said sets.

3. A method, as defined in claim 2, wherein said medium is photographic film supported on a drum, and said drum is rotated relative to said array to move said medium and said array relative to each other.

4. A method, as defined in claim 2, wherein said array is supported on a carriage which is mounted for linear movement relative to said medium to produce said relative movement between said array and said medium.

5. A method, as defined in claim 2, wherein certain of said sources are inactivated when the first set of successive sets of raster lines is formed.

6. A method, as defined in claim 5, wherein sources are inactivated according to following equation:

$$n \leq N(1 - p/k)$$

where
    n is the index number of the source inactivated;
    N is the number of sources in the array;
    p is the number of the set being formed; and
    k is an integer which is the interleaving factor.

7. A method, as defined in claim 1, wherein said distance is equal to the number of elements in said array times the distance between elements divided by a preselected integer which determines the spacing between raster lines.

8. A method of scanning for use in a device having an array of N elements which interact with a recording medium, said elements being spaced from each other by a distance d, and successive raster lines being separated by a distance equal to d/k where k is an integer, said method comprising the steps of:
    forming a first set of raster lines on said medium by producing relative movement between said medium and said array, the number of lines in said first set being less than said number of elements;
    producing relative movement between said array and said medium in a direction transverse to said raster lines by a distance equal to Nd/k; and
    forming a second set of raster lines which are parallel to said first set of lines.

9. A method of scanning for use in a device in which a plurality of light beams interact with an image storage medium, said method comprising the steps of:
    moving said medium and said beams relative to each other to produce successive sets of lines, at least some of the raster lines in one set being interleaved with raster lines in another set; and
    producing relative movement between said beams and said medium for a constant predetermined distance in a direction transverse to said raster lines after each set of lines is produced.

10. A method of scanning for use in a device having a plurality of operative elements which interact with an image storage medium, said method comprising the steps of:
    moving said medium and said elements relative to each other to produce successive sets of raster lines, at least some of the raster lines in one set being interleaved with raster lines in another set; and
    producing relative movement between said elements and said medium at a constant predetermined velocity in a direction transverse to said raster lines.

11. A method of scanning for use in a device which includes an array having a matrix of operative elements which interact with an image storage medium, said method comprising the steps of:
    actuating said operative elements to produce a predetermined number of patterns of scan areas, at least some of the scan areas in one pattern being interleaved with scan areas in another pattern;
    moving said medium and said array relative to each other a constant distance in a first direction after each pattern of said predetermined number is produced; and
    producing relative movement between said array and said medium for a constant distance in a second direction transverse to said first direction after said predetermined number of patterns are produced.

* * * * *

UNITED STATES PATENT AND TRADEMARK OFFICE
CERTIFICATE OF CORRECTION

PATENT NO. : 4,900,130

DATED : February 13, 1990

INVENTOR(S) : Haas

It is certified that error appears in the above-identified patent and that said Letters Patent is hereby corrected as shown below:

Column 8, line 35, before "lines", insert -- raster --.

Signed and Sealed this

Eighth Day of January, 1991

Attest:

HARRY F. MANBECK, JR.

*Attesting Officer*    *Commissioner of Patents and Trademarks*